May 17, 1966  E. WILDHABER  3,251,236
GEAR TOOTH SHAPE

Filed Feb. 17, 1964  2 Sheets-Sheet 1

INVENTOR:
Ernest Wildhaber

May 17, 1966  E. WILDHABER  3,251,236
GEAR TOOTH SHAPE
Filed Feb. 17, 1964  2 Sheets-Sheet 2

INVENTOR:
Ernest Wildhaber

United States Patent Office 3,251,236
Patented May 17, 1966

3,251,236
GEAR TOOTH SHAPE
Ernest Wildhaber, Brighton, N.Y.
(124 Summit Drive, Rochester, N.Y. 14620)
Filed Feb. 17, 1964, Ser. No. 345,263
9 Claims. (Cl. 74—462)

The present invention relates to the tooth shape of gears for power transmission, and particularly to gears having axes in a common plane, gears that run on parallel or intersecting axes.

The chief object of the invention is to devise a tooth shape that improves quietness of operation, so that the gears run more quietly and smoothly. Other objects will appear in the specification and in the recital of the appended claims.

If gears were absolutely accurate and the gears and their mounting absolutely rigid, then any correct tooth shape would give quiet gears. However these premises are not entirely fulfilled. In operation a gear tooth gets into contact, stays in contact for a brief period, and leaves contact or mesh again. Noise is caused chiefly by the way in which the tooth starts its contact. It depends on whether the teeth about to contact approach each other at a slow rate or at a fast rate. If they approach each other at a fast rate then any given pitch error or deflection will cause them to hit each other with more relative speed than if they approach at a slow rate. Their bump dissipates more energy and causes more noise.

This will be further described with reference to the drawings, in which

Figure 11:
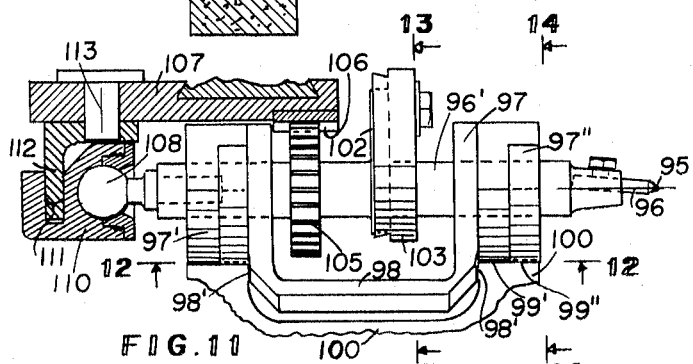
Figure 13:
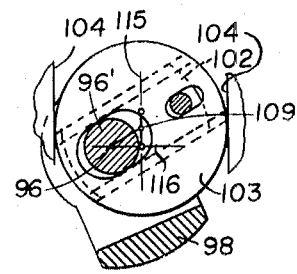
Figure 12:
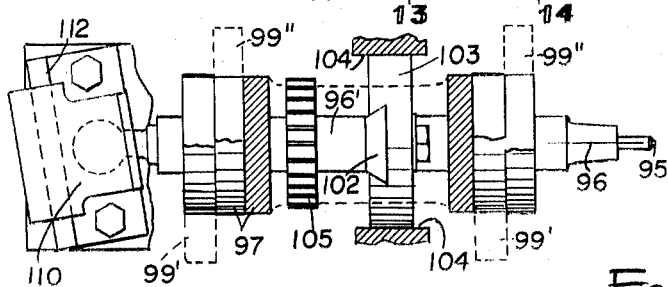
Figure 14:
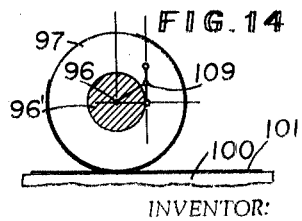

FIGS. 11 to 14 are somewhat diagrammatic views of a dresser for applying this profile to the axial plane of any grinding wheel. FIG. 11 is a plan view. FIG. 12 is a section taken along lines 12—12 of FIG. 11 and a view looking in the direction of the arrows. FIG. 13 and FIG. 14 are sections taken along lines 13—13 and 14—14 of FIG. 11 respectively, looking in the direction of the arrows.

Figure 1:
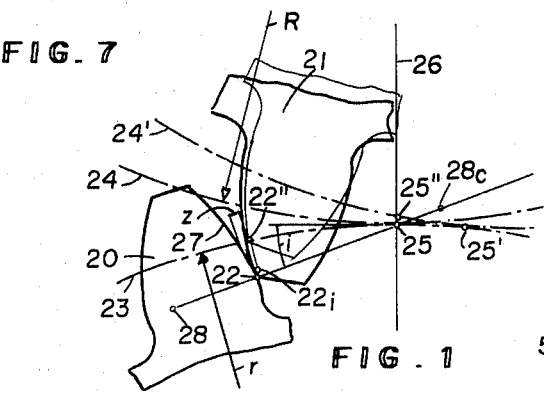
FIG. 1 is a diagram explanatory of the principles underlying the invention and showing two gear teeth about to start contact.

FIG. 1 shows gear teeth 20, 21 just starting contact at point 22. The gears have pitch circles 23, 24 which contact at pitch point 25 on center line 26. The pitch circles are imagined circles that are rigid with the respective gears. They roll on each other without slippage.

To determine the relative position of tooth 21 immediately before contact starts, we let pitch circle 24 with tooth 21 roll slightly on pitch circle 23 that is maintained stationary. Pitch circle 24 then may assume a position 24', contacting pitch circle 23 at 25'. Point 25 of pitch circle 24 has then moved to 25''; and point 22 of tooth 21 to 22''.

Point 22'' is now at a distance $z$ from the profile 27 of tooth 20. This profile has a curvature center 28 on profile normal 22–25, at a distance $p=22$–$28$ from 22. Point 22 itself has a distance $e=22$–$25$ from pitch point 25.

Distance $z$ depends on the profile curvature of tooth 20 at point 22. It decreases with decreasing profile curvature, the less profile 27 is convexly curved. It further decreases when the profile is concavely curved in the vicinity of point 22. Thus, if its curvature center is at 28c and the profile almost coincides for a portion with the profile of tooth 21, the distance $z$ of separation is only a fraction of the distance $z$ from profile 27. Accordingly point 22'' approaches the concave profile at a much slower rate than it approaches profile 27.

The load-carrying teeth deflect very slightly under load while tooth 20 about to enter engagement is as yet undeflected and has a slightly decreased distance from the preceding loaded tooth of the same gear. Tooth 21 also is as yet undeflected and has an increased distance from the preceding loaded tooth. Thus they are approached towards each other and exposed to entering mesh prematurely. Also if tooth 21 has a slight pitch error that places it out of step to the left, or tooth 20 is out of step to the right, the teeth are approached towards each other some distance $z$ and engage at some relative normal velocity, at the normal velocity corresponding to distance $z$. They bump into each other. The energy dissipated in the bump is converted into noise and heat. It is proportional to the square of the normal velocity and directly proportional to $z$. Thus less noise is excited with concave profile curvature than with convex profile 27.

In accordance with the invention the working tooth profile is concavely curved adjacent the root surface, in the region where mesh starts, and has a curvature center in the vicinity of the curvature center of the convex mating profile.

Distance $z$ can be expressed in a formula. Let $x$ denote the length of arc 25–25' and $r$, $R$ the pitch radii, the radii of the pitch circles 23, 24. The gear in pitch circle position 24' is turned with respect to its mate through an angle $v$, $$v = x\left(\frac{1}{r} + \frac{1}{R}\right)$$

in radian measure.

Position 22'' can also be attained by first displacing point 25 to 25'' and moving radius $e$ with it without turning, to place point 22 at $22_1$; and then turning radius $e$ about 25'' through the angle $v$.

Distance $z$ is measured in a direction parallel to normal 25–22 that is inclined from the peripheral direction at pitch point 25 at an angle $i$. It can be expressed in terms of $x^2$, $x^3$, $x^4$ and so on. As we are interested only in the immediate vicinity of point 22, the quantities $x$ are very small, and the terms in $x^3$ and so on are so much smaller than the term in $x^2$ that they can be neglected. It can be demonstrated that distance $z$ can then be put down as $$z = \frac{1}{2}x^2 \left(\frac{1}{r} + \frac{1}{R}\right) \cdot B$$

where B is $$B = \left(\frac{1}{r} + \frac{1}{R}\right)(e+p) \cdot \frac{e}{p} + \sin i$$

These formulas apply to convex profiles (27) and also to concave profile portions when $p$ ($=22-28_c$) is introduced negative on concave portions.

By differentiation:

$$\frac{dz}{dx} = x \left(\frac{1}{r} + \frac{1}{R}\right) \cdot B$$

Hence $$\left(\frac{dz}{dx}\right)^2 = 2z \left(\frac{1}{r} + \frac{1}{R}\right) B$$

The energy dissipated in the bump is proportional to $$\left(\frac{dz}{dx}\right)^2$$

and therefore also to $z$.

Figure 2:
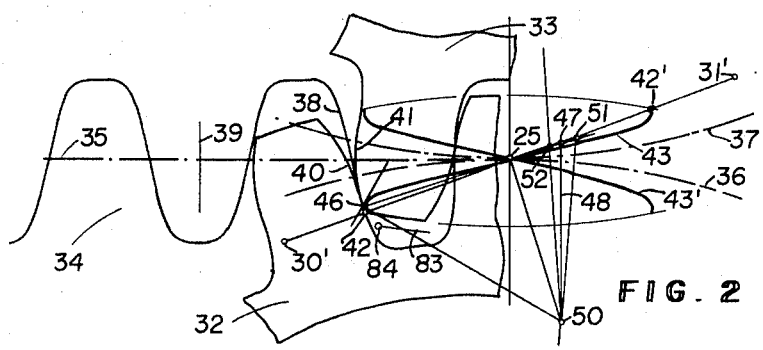
FIG. 2 is a view of the region of mesh of a pair of gears running on parallel axes and having equal tooth numbers, illustrating an embodiment of the present invention. It also shows the basic rack profile.

FIG. 2 illustrates an embodiment of the invention. It shows the profiles of a pair of cylindrical gears running on parallel axes 30, 31. Specifically it illustrates the profiles of a 22/22 tooth combination in a plane perpendicular to said axes. The gears 32, 33 are conjugate to a basic member in the form of a rack 34. The rack has a pitch line 35 rolling on the pitch circles 36, 37 of the gears. The pitch line and pitch circles contact at pitch point 25 that is a point of the instantaneous axis of relative motion. The rack profiles 38 can be considered interposed between the intermeshing gear profiles 40, 41, and contact the gear profiles at the same points they contact each other. In other words, the gears 32, 33 are conjugate to a pair of racks that are counterparts of one another and have profiles 38.

Clearance is provided between the outside surface of each gear and the tooth bottoms of the mating gear. It amounts to more than 5% of the tooth depth.

The rack profile 38 is oppositely curved on opposite sides of its central portion and increasingly curved towards its ends. The inclination of profile 38 to the depthwise direction 39 of the teeth is smallest adjacent the central profile portion. It increases towards both profile ends, but is smaller than half a right angle (45°) at both ends of the path of contact 43. Similarly, on the gears the profile normals of the central profile portions have the largest distance from the gear axis. The said distances decrease towards the profile ends but remain larger than 70% of the pitch radius.

At point 42, at the start of the path of contact when driving gear 32 turns clockwise, the profile-curvature center coincides with pitch point 25 in the instance illustrated. Generally it is close to the pitch surface or pitch line 35, at a distance preferably within one eighth of the tooth depth from said pitch surface. This applies also to the gears themselves. It causes the profile of gear 32 to be concavely curved at point 42 where mesh starts, and equally curved at that point as the convex mating profile of gear 33 when said curvature center lies on the pitch surface. In the above formula for B, $p=-e$ in this case, and B becomes $$B = \sin i$$

This may be compared with involute gears of the same size and tooth ratio and having a straight path of contact 42–25–42′. Points 30′, 31′ are the curvature centers of the contacting involute profiles, being the normal projections of the gear centers 30, 31 to straight path 42–25–42′. $p$ is then distance 42–30′ while $e$ remains distance 42–25. With the shown standard depth proportions of the teeth, and $i=20$ deg. pressure angle, as shown, the coefficient B becomes $$B = 4.25 \sin i \quad \text{(involute)}$$

B is 4.26 times larger than on the proposed form of tooth, which thus converts much less energy into noise.

FIG. 2 also illustrates a known, but often forgotten, geometric construction for determining the curvature centers of the contacting gear profiles from a given rack profile. Point 46 gets into contact position almost simultaneously with point 42. Its curvature center 47 of the given rack profile lies on contact normal 46–25. Draw line 48 at right angles to the path of the curvature center 47 and locate the intersection point 50 of line 48 with a line drawn through pitch point 25 at right angles to contact normal 46–25. Draw lines connecting point 50 with the gear centers 30, 31. Their intersection points 51, 52 are the curvature centers of the profiles of the respective gears. 46–51 and 46–52 are their curvature radii. They determine the intimacy of contact and the surface strength of the teeth. The radius $r_r$ of relative curvature describes the same contact intimacy and can be computed in known manner:

$$\frac{1}{r_r} = \frac{1}{46\text{--}52} - \frac{1}{46\text{--}51}$$

when the curvature centers lie on the same side of contact point 46. $r_r$ is a measure of the surface strength of the teeth and has been plotted in FIG. 3 as an ordinate of a curve 53, such as ordinate 54 at any point 55. Point 55 defines the position of mesh where the profiles are turned away from the pitch point 25 a distance 25–55 measured as an arc on the pitch circle. Points $55_s$ and $55_e$ represent the start and the end of the mesh of gears 32, 33. It is seen that the radius $r_r$ or relative curvature is largest at the start and at the end of mesh. Curve 53 is based on the preferred profile 38 of the basic rack, on profiles 38 that are general sine-curves, as further described hereafter.

Figure 3:
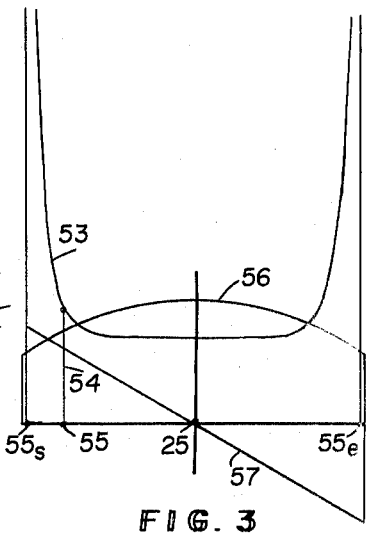
FIG. 3 is a set of graphs describing characteristics of the gears shown in FIG. 2 and comparing them with the characteristics of conventional involute gears.

FIG. 3 also shows a curve 56 whose ordinates define $r_r$ for involute teeth that start mesh at the same point 42 as gears 32, 33 and end mesh at the same point 42′. Its largest radius $r_r$ is in the mid-position, where for an instant true rolling contact exists. Sliding of the contacting tooth profiles is in direct proportion to the distance from the mid-position, and can be represented by the ordinates of an inclined straight line 57. The proposed teeth have the largest surface strength where there is the most sliding and where increased surface strength is needed, while the involute teeth have the least surface strength there.

Figure 4:
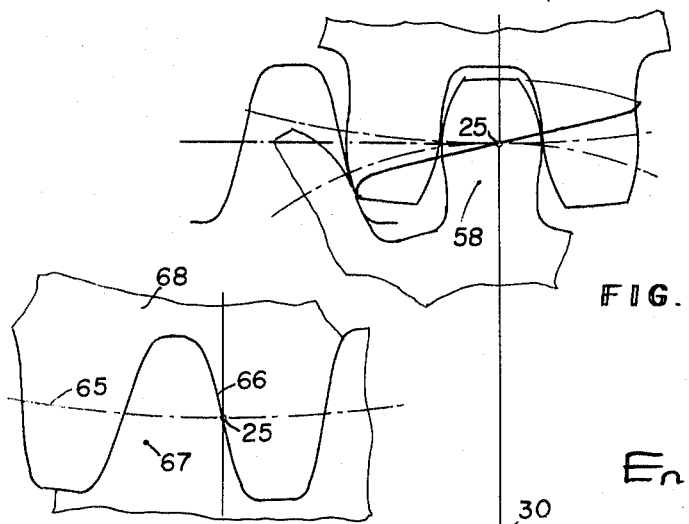
FIG. 4 is a view similar to FIG. 2, but showing a gear pair with unequal tooth numbers.

FIG. 4 shows one application of the invention to a gear pair having unequal tooth numbers and the same gear centers 30, 31. The basic rack shape is the same as above described. Although the pinion 58 has only twelve teeth it is possible to use equal tooth addenda on both the gear and the pinion, without incurring undercut. The addendum is understood to be the tooth height above the pitch circle. Properly designed involute gears have an increased addendum on the pinion and a decreased addendum on the gear. Such shift of the teeth is not a necessity with the proposed tooth shape, but could also be used if desired.

Figure 5:
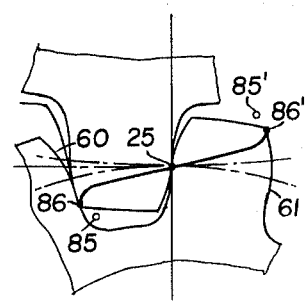
FIG. 5 is a view of the mesh region of a gear pair having the same pitch diameters as the gear pair shown in FIG. 4, but having a duration of profile contact of approximately one pitch.

In the embodiment shown in FIG. 5 the duration of profile contact is approximately one pitch, and exceeds one pitch by less than five percent. When a new tooth profile 60 enters mesh the preceding profile 61 is then in the region of intimate contact that has a lubricant film of large thickness. This thickness tends to make up for the tooth-bending deflection.

Figure 7:
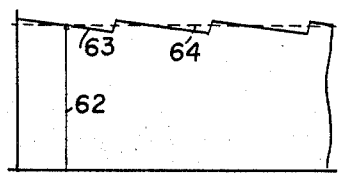
FIG. 7 is a velocity diagram illustarting the effect of ease-off, especially profile ease-off on gears with straight teeth.

For a smoother tooth engagement of conventional gears it is common practice to ease off the profile ends. The convex profiles are made more curved than called for on the basis of rigidity and uniformity of motion. This results in a slightly fluctuating motion of the driven member when the driver turns at a uniform rate, as illustrated in FIG. 7. This figure is a velocity diagram. The ordinates 62 of saw-tooth line 63 define the instantaneous velocities of the driven member when the driver turns at uniform velocity indicated by dotted straight line 64. The velocity of the driven member drops somewhat during the mesh, to be boosted up again when a new tooth enters mesh.

In this way the contact is kept away from the very tooth end of the driven member, avoiding worse fluctuations and edge contact. However these constantly repeating fluctuations are apt to be in resonance with the driving system at some speed and to cause noise at these speeds. With the present invention such profile ease-off can be reduced, also reducing noise at resonant speeds.

Figure 6:
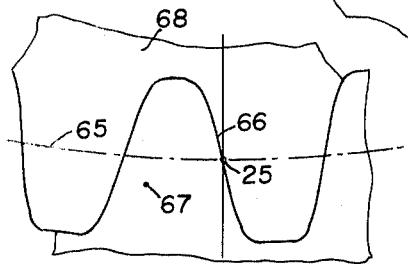
FIG. 6 is a fragmentary view of a pair of basic gear members other than racks.

While I have shown in FIG. 2 a basic member in the form of a rack, or a crown gear for bevel gears, basic members with curved pitch lines 65 could also be used, if desired, see FIG. 6. The two members of the gear pair are conjugate to the profile shape 66 of the basic member from opposite sides. This is another way of saying that they are conjugate to a pair of basic members 67, 68 that are counterparts of each other. One of the basic members may be the larger gear of the pair.

On gears with parallel axes the shown profiles lie in a plane perpendicular to said axes. On bevel gears they are essentially the profiles of the known back-cone development. In either case they can also be considered the profiles in a section perpendicular to the pitch lines of the teeth.

*Preferred profile*

Figure 8:
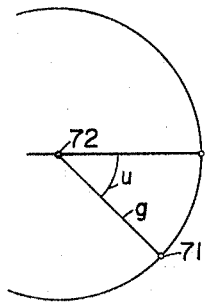
FIGS. 8 and 9 are diagrams further explanatory of the preferred profile of the basic member.

The preferred form of profile of the basic member (38, FIG. 2) is a general sine-curve, that is a large portion thereof. The sine-curve 70 will now be further described with FIGURES 8 and 9. It can be considered the projection of a helix of constant lead to an axial plane thereof. The helix may be described by a point 71 that moves about axis 72 (FIG. 8) through angles $u$ and simultaneously moves in the direction of said axis in proportion to angle $u$. With $g$ denoting the radial distance of point 71 from axis 72, and $k$ a constant, the coordinates $x$, $y$ of curve 70 (FIG. 9) can be defined as $$x = \frac{g \text{ arc } u}{k}; \quad y = g \sin u$$

The term arc $u$ indicates radian measure of angle $u$.

The general sine-curve does not lose its character by projection. Thus if the above equations define the profile of a straight rack tooth in a transverse section perpendicular to the gear axes, the section normal to the rack teeth has a profile defined by the same equations with merely a changed constant $k$.

The inclination angle $t$ of the curve to the horizontal or X-direction is obtained by differentiation $$\frac{dy}{dx} = \tan t = k \cos u$$

The curvature radius $r_c$ is found to be $$r_c = \frac{g}{k^2 \sin u \cdot \cos^3 t}$$

as can be demonstrated.

Figure 9:
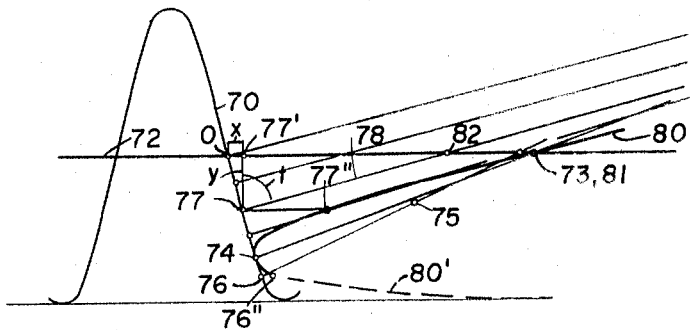

FIG. 9 shows the profile normals at several points of profile 70. Their inclination to axis 72 or X-axis changes at an increasing rate with increasing distance of the profile point from said axis. The profile 70 has a point of inflection at O. It is a continuous single curve without discontinuity. There are no abrupt changes of curvature.

The curvature center 73 at point 74 of profile 70 lies on the X-axis. 75 denotes the curvature center at point 76. The curvature center at point 77 lies on normal 78 beyond the reach of the drawing.

The path of contact 80 between the rack profile and a gear and between the gears themselves passes through pitch point 81. Its points have coordinates $x'$, $y$, the latter being as before $y = g \sin u$. The $x'$ coordinate is based on pitch point or origin 81. For any point 77 it is the distance 77'–82 between the projection 77' of point 77 to the X-axis and the intersection point 82 of its normal 78 with the X-axis. Point 77 becomes a point of the path of contact in position 77''. The $x'$ coordinate can be put down as $$x' = y \tan t = g \sin u \cdot k \cdot \cos u = \tfrac{1}{2} g \cdot k \cdot \sin 2u$$

It is found that the path of contact has a tangent perpendicular to the X-axis at $u = 45$ degrees. $x'$ is a maximum there. At point 74 the tangent to the path of contact 80 is perpendicular to $e = 74–81$. Point 74 is the first, or last, point of contact between two teeth. At point 74 the path of contact turns back. Point 76 gets into contact at 76''. If the path were continued beyond point 76'' it would extend along dotted line 80'.

Thus by simply extending the teeth we can shift the start of contact away from the outside end of a tooth, while still making use of the tooth end.

In the embodiment of FIG. 2 this can be accomplished by extending the outside circle of gear 33 to 83 and correspondingly increasing the tooth depth on gear 32. The mesh continues to start at point 42. The adjacent outside edge of the tooth side 41 gets into contact later, at 84. Similarly an increase in tooth depth in the embodiment of FIG. 5 keeps the starting contact 86 away from end point 85 of the extended tooth. Contact ends at 86', away from end point 85'.

*Producing the basic profile*

Most gears are made by generation, whereby a tool describes tooth sides of a basic member, such as a rack or a crown gear. It is important therefore to be able to accurately produce the profile of the basic member, to be applied to the tool.

The general sine-curve, which is the preferred form of the basic profile, or approximations thereof, can be readily produced. It is considered sufficient to describe the dressing of a grinding wheel to such a profile.

Figure 10:
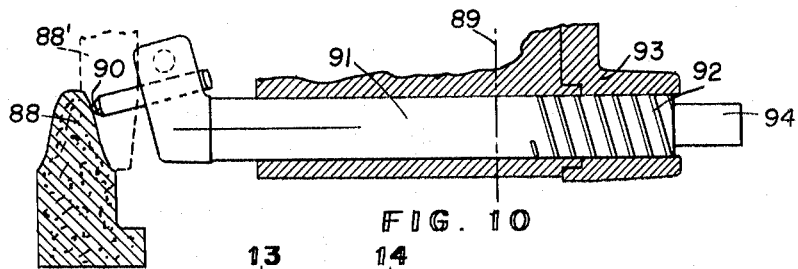
FIG. 10 is a simplified side view of a dresser for applying a profile of this general character to a face-type grinding wheel.

FIG. 10 shows a dresser for applying it to a face-type grinding wheel 88 with axis 89. A dressing diamond 90 is eccentrically secured to a rotatable and axially movable shaft 91 that is constrained by a screw thread 92 and stationary nut 93 to perform a helical motion of constant lead. Shaft 91 is set at right angles to the wheel axis 89 and is offset therefrom so that the diamond path remains close to the axial wheel plane parallel to shaft 91. Shaft 91 may be turned by hand by applying a wrench to projection 94. It is turned through an angle in excess of sixty or ninety degrees.

The tooth sides of one member of a gear pair are ground with wheel 88. The mating tooth sides of the other member may be ground with a coaxial wheel, such as wheel 88' that has an outside grinding surface matching the inside grinding surface of wheel 88.

FIGS. 11 to 14 illustrate an adjustable dresser for dressing directly in an axial plane of any grinding wheel.

Diamond 95 is mounted on the axis 96 of a shaft 96' that is rotatable and axially movable in a support 97. Support 97 comprises two coaxial cylindrical parts 97', 97'' rigidly connected by an arm 98. Flexible steel tapes 99', 99'' are secured to parts 97', 97'' and to the plane side 101 of a guide part 100, to constrain support 97 to roll thereon, so that axis 96 describes an axial plane of the grinding wheel to be dressed. Support 97 is held axially by the engagement of its sides 98' with the guide part.

Shaft 96' contains an arm 102 along which an eccentric 103 is radially adjustable. The eccentric engages parallel plane sides 104 of a stationary slot that extends at right angles to the plane described by axis 96. They constrain the axis 109 of the eccentric to move in a plane 115 perpendicular to the plane 116 described by axis 96.

Shaft 96' is turned by means of a gear 105 rigid with it and engaged by a rack 106 rigid with a slide 107. This slide may be moved by a hydraulic piston, as common on dressers, or by hand. As it turns shaft 96' through rack 106 and gear 105 the support 97 rolls on guide part 100, propelled thereon by the eccentric 103 engaging sides 104.

A ball part 108 is secured to shaft 96' so that the ball center lies on axis 96. It is engaged by a two-piece socket member 110 containing a guide slot 111. Slot 111 is engaged by a rail part 112 secured to slide 107. The rail part is angularly adjustable thereon about an axis 113 at right angles to plane 116 described by axis 96. Upon such adjustment the displacement of slide 107 also displaces shaft 96' axially in proportion to the turning angle of shaft 96', and increasingly with increased angular setting of the rail part 112. Thus diamond 95 describes the general sine-curved desired. The dresser unit may have further adjustments for wheel diameter and tooth depth, as readily understood.

It is seen that an accurate mechanical production of the sine-curve is feasible.

While the invention has been described in connection with different embodiments thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

I claim:

1. A gear tooth shape conjugate to a basic member whose tooth profile is oppositely curved on opposite sides of its central portion and increasingly curved towards its ends, the inclination of said profile to the depthwise tooth direction being smallest adjacent said central portion and being smaller than half a right angle at both ends of the path of contact, the center of curvature of said profile at the start of contact being close to the pitch surface of said basic member and having a distance less than one eighth of tooth depth from said pitch surface.

2. A gear tooth shape conjugate to a basic member whose tooth profile is oppositely curved on opposite sides of its central portion and increasingly curved towards its ends, the inclination of said profile to the depthwise tooth direction being smallest adjacent said central portion and being smaller than half a right angle at both ends of the path of contact, said profile being a continuous single curve without discontinuity and having a point of inflection between its ends.

3. A gear tooth shape according to claim 2, wherein said profile is a portion of a general sine-curve.

4. A tooth shape for cylindrical gears according to claim 3, wherein said basic member is a rack with straight teeth, and wherein said profile lies in a plane perpendicular to said straight teeth.

5. A gear tooth shape according to claim 2, wherein said profile is a portion of a general sine-curve, the working profile corresponding to an angle of the sine-function of at least ninety degrees.

6. A gear tooth shape according to claim 2, wherein the outside end of the active tooth profile of the gear has a curvature center lying on the profile normal between said end and the intersection of said normal with the gear pitch surface.

7. A tooth shape for a pair of gears according to claim 2, said gears having parallel axes, wherein the profiles in a plane perpendicular to said axes have a duration of contact of approximately one pitch and exceeding one pitch by less than five percent.

8. A cylindrical gear having working profiles that are convex on their addendum and concave on part of their dedendum, said profiles lying in a plane perpendicular to the gear axis and being continuous single curves without abrupt change of curvature, the curvature centers of said concave portion having varying distances from the pitch surface of said gear and having a smallest distance therefrom smaller than one eighth of the tooth depth.

9. A cylindrical gear having working profies that are convex on their addendum and concave on part of their dedendum, said profiles lying in a plane perpendicular to the gear axis and being continuous single curves without abrupt change of curvature, the normals of said profiles having varying distances from the gear axis, said distances decreasing towards both profile ends, but being more than seventy percent of the pitch radius at both ends of said working profiles.

References Cited by the Examiner

UNITED STATES PATENTS

| | | | |
|---|---|---|---|
| 2,748,761 | 6/1956 | Winegar | 125—11 |
| 2,808,732 | 10/1957 | Champion | 74—462 |
| 3,994,230 | 8/1961 | Haberland et al. | 74—462 |
| 3,081,762 | 3/1963 | Smith | 125—11 |

DAVID J. WILLIAMOWSKY, *Primary Examiner.*

L. H. GERIN, *Assistant Examiner.*